(12) United States Patent
Pesacov

(10) Patent No.: US 12,515,002 B1
(45) Date of Patent: Jan. 6, 2026

(54) KINK AND TANGLE RESISTANT SMART-ENABLED NASAL CANNULA AND PATIENT OXYGEN CONCENTRATOR

(71) Applicant: 15892031 Canada Inc., Vaughan (CA)

(72) Inventor: Baruh Pesacov, Thornhill (CA)

(73) Assignee: 15892031 Canada Inc., Vaughan (CA)

( * ) Notice: Subject to any disclaimer, the term of this patent is extended or adjusted under 35 U.S.C. 154(b) by 0 days.

(21) Appl. No.: 19/072,888

(22) Filed: Mar. 6, 2025

(51) Int. Cl.
| A61M 16/00 | (2006.01) |
| A61M 16/10 | (2006.01) |
| A61M 16/20 | (2006.01) |
| G16H 40/63 | (2018.01) |

(52) U.S. Cl.
CPC ...... *A61M 16/024* (2017.08); *A61M 16/0003* (2014.02); *A61M 16/101* (2014.02); *A61M 16/202* (2014.02); *G16H 40/63* (2018.01); *A61M 2202/0007* (2013.01); *A61M 2202/0208* (2013.01); *A61M 2205/3303* (2013.01); *A61M 2205/3327* (2013.01); *A61M 2205/3334* (2013.01); *A61M 2205/3344* (2013.01); *A61M 2205/3372* (2013.01); *A61M 2205/3379* (2013.01); *A61M 2205/502* (2013.01); *A61M 2230/005* (2013.01); *A61M 2230/40* (2013.01); *A61M 2230/63* (2013.01)

(58) Field of Classification Search
CPC ... B01D 2259/4533; B01D 2259/4541; A51M 16/101; A61M 16/024; A61M 16/003
See application file for complete search history.

(56) References Cited

U.S. PATENT DOCUMENTS

| 5,928,189 | A | 7/1999 | Phillips et al. |
| 6,186,142 | B1 | 2/2001 | Schmidt et al. |
| 6,192,883 | B1 | 2/2001 | Miller |
| 8,997,747 | B2 | 4/2015 | Hobson et al. |
| 9,649,465 | B2 | 5/2017 | Wilkinson et al. |
| 9,974,918 | B2 | 5/2018 | Armstrong et al. |
| 11,318,276 | B2 | 5/2022 | Metelits |
| 11,684,744 | B2 | 6/2023 | Wilkinson et al. |
| 12,102,761 | B2 | 10/2024 | Latorre Rojas et al. |
| 12,171,935 | B2 | 12/2024 | Gerred et al. |

(Continued)

FOREIGN PATENT DOCUMENTS

| EP | 4028098 A1 | 7/2022 |
| EP | 3603712 B1 | 11/2023 |

(Continued)

*Primary Examiner* — Margaret M Luarca

(57) ABSTRACT

Provided is a kink and tangle resistant smart-enabled nasal cannula and oxygen concentrator. The cannula includes a supply tube having a sidewall, an electrical cable integrally formed with the sidewall, and a patient movement sensor connector connected to the electrical cable. The oxygen concentrator includes an adaptive oxygen concentrator flow control system having a microcontroller unit configured to store oxygen mass flow rate setpoints, and different PID configurations associated with states of a system control factor, determine a target oxygen mass flow rate setpoint, determine a current control factor state, and identify a selected PID configuration. A PID controller is configured to receive an oxygen flow measurement, determine an oxygen flow valve control signal, and transmit the oxygen flow valve control signal to an electro-mechanical patient oxygen flow valve.

13 Claims, 8 Drawing Sheets

(56) References Cited

U.S. PATENT DOCUMENTS

| | | | |
|---|---|---|---|
| 12,171,946 B2 | 12/2024 | Klink et al. | |
| 2009/0107500 A1* | 4/2009 | Edwards | B01D 53/0446 128/205.12 |
| 2009/0151719 A1* | 6/2009 | Wondka | A61M 16/024 128/204.23 |
| 2011/0247622 A1* | 10/2011 | Schneider | A61M 16/107 128/204.23 |
| 2022/0016370 A1 | 1/2022 | Burgess | |
| 2022/0379066 A1 | 12/2022 | Navarro et al. | |
| 2023/0112963 A1 | 4/2023 | Ting et al. | |
| 2023/0149655 A1* | 5/2023 | Yuen | A61M 16/202 95/8 |
| 2023/0390513 A1 | 12/2023 | Valiyambath et al. | |
| 2024/0024610 A1 | 1/2024 | Wilkinson et al. | |
| 2024/0050682 A1 | 2/2024 | Gulley et al. | |
| 2024/0100274 A1 | 3/2024 | Trama | |

FOREIGN PATENT DOCUMENTS

| | | |
|---|---|---|
| FR | 3006881 A1 | 12/2014 |
| WO | 2023205089 A1 | 10/2023 |
| WO | 2024124290 A1 | 6/2024 |

* cited by examiner

KINK AND TANGLE RESISTANT SMART-ENABLED NASAL CANNULA AND PATIENT OXYGEN CONCENTRATOR

FIELD

This application relates to the field of kink and tangle resistant smart-enabled nasal cannulas and patient oxygen concentrators.

INTRODUCTION

Oxygen therapy is a critical treatment for patients with respiratory conditions. Nasal cannulas and oxygen concentrators are commonly used medical devices designed to deliver supplemental oxygen efficiently to patients requiring respiratory support.

A nasal cannula is a lightweight, flexible device consisting of a tube with a patient interface, such as two prongs that fit into the patient's nostrils. This device is designed to provide a continuous flow of oxygen while allowing patients to breathe normally. Nasal cannulas are often used in combination with oxygen concentrators to deliver oxygen to a patient. Oxygen concentrators are devices that extract and concentrate oxygen from ambient air to deliver higher oxygen concentration to the patient. Unlike traditional oxygen tanks, concentrators do not require refilling and can provide an uninterrupted supply of oxygen.

DRAWINGS

SUMMARY

Figure 1:
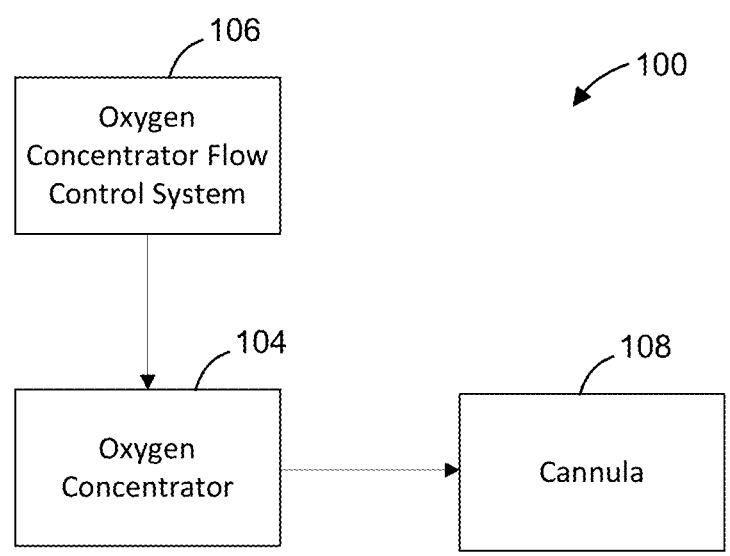
FIG. 1 is a schematic illustration of a patient oxygen supply system, in accordance with an embodiment.

In accordance with an example embodiment, there is provided a kink and tangle resistant smart-enabled nasal cannula. The nasal cannula includes an oxygen supply tube, an electrical cable, a patient movement sensor, a split joint, and a patient interface. The oxygen supply tube may have a substantially circular supply tube sidewall, a supply tube outer diameter, an oxygen concentrator connection end and a patient end downstream of the oxygen concentrator connection end. The electrical cable may have a substantially circular cable sidewall integrally formed with the supply tube sidewall, an electrical cable diameter less than the supply tube outer diameter, an electrical cable oxygen concentrator connection end proximate the oxygen concentrator connection end of the oxygen supply tube, a patient movement sensor connection end proximate the patient end of the oxygen supply tube, and a plurality of insulated conductors extending from the electrical cable oxygen concentrator connection end to the patient movement sensor connection end. The patient movement sensor connector may be connected to the electrical cable at the patient movement sensor connection end. The split joint may have a split joint patient interface end upstream of two split joint oxygen supply tube ends. The patient end of the oxygen supply tube may be connected to the split joint patient interface end. The patient interface may be connected to the split joint patient interface end. The patient interface may have at least one nasal prong.

In accordance with an example embodiment, there is provided a patient oxygen concentrator. The patient oxygen concentrator includes an electro-mechanical patient oxygen flow valve, and an adaptive oxygen concentrator flow control system. The adaptive oxygen concentrator flow control system may be communicatively coupled to the electro-mechanical patient oxygen flow valve. The adaptive oxygen concentrator flow control system may include: a microcontroller unit (MCU) and a PID controller. The MCU may include one or more MCU processors and an MCU memory, the one or more MCU processors configured to collectively: store, in the MCU memory, a plurality of patient oxygen mass flow rate setpoints, the plurality of patient oxygen mass flow rate setpoints including at least a low patient activity setpoint that is lower than a high patient activity setpoint, store, in the MCU memory, a plurality of different PID configurations, at least two of the PID configurations being associated with a system control factor, wherein the system control factor is at least one of patient activity level, battery charge level, ambient environmental condition, component wear sensitivity, and time of day, the system control factor having at least two mutually exclusive states including at least a first control factor state and a second control factor state, the at least two PID configurations including a first PID configuration corresponding to the first control factor state and a second PID configuration corresponding with the second control factor state, receive patient movement sensor signals from at least one remote patient movement sensor cable port, determine a target patient oxygen mass flow rate setpoint from among the plurality of patient oxygen mass flow rate setpoints based at least in part on the patient movement sensor signals, determine a current control factor state from among the at least two control factor states of the system control factor, and identify a selected PID configuration which is the PID configuration associated with the current control factor state. The PID controller may be configured to: receive a patient oxygen flow measurement; determine a patient oxygen flow valve control signal based on the target patient oxygen mass flow rate, the patient oxygen flow measurement, and the selected PID configuration; and transmit the patient oxygen flow valve control signal to the electro-mechanical patient oxygen flow valve.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein.

Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a first element is said to be 'communicatively coupled to' or 'communicatively connected to' or 'connected in communication with' a second element where the first element is configured to send or receive electronic signals (e.g. data) to or from the second element, and the second element is configured to receive or send the electronic signals from or to the first element. The communication may be wired (e.g. the first and second elements are connected by one or more data cables), or wireless (e.g. at least one of the first and second elements has a wireless transmitter, and at least the other of the first and second elements has a wireless receiver). The electronic signals may be analog or digital. The communication may be one-way or two-way. In some cases, the communication may conform to one or more standard protocols (e.g. SPI, I²C, Bluetooth™, or IEEE™ 802.11).

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g. 112$a$, or 112$_1$). Multiple elements herein may be identified by part numbers that share a base number in common and that differ by their suffixes (e.g. 112$_1$, 112$_2$, and 112$_3$). All elements with a common base number may be referred to collectively or generically using the base number without a suffix (e.g. 112).

The embodiments described herein address the problem of supplying a variable quantity of oxygen enriched air to a patient during respiratory therapy. FIG. 1 shows a patient oxygen supply system 100 in accordance with an embodiment. As shown, system 100 includes an oxygen concentrator flow control system 106, an oxygen concentrator 104 and a nasal cannula 108. In use, the patient wears cannula 108, while oxygen concentrator 104 supplies oxygen to the cannula for delivery to the patient. The oxygen flow to the patient may be regulated by the oxygen concentrator's flow control system 106.

In existing patient oxygen supply systems, the oxygen concentrator is manually controlled, requiring the patient to adjust the concentrator's adjustment valve to regulate the flow of oxygen they receive. Adjustments are often necessary based on the patient's level of activity, requiring them to manually modify their oxygen supply settings. For instance, if the patient becomes more active, their oxygen needs increase, prompting them to walk to the concentrator and adjust the oxygen flow accordingly. Similarly, environmental factors such as temperature and altitude may also impact patient oxygen requirements. In such cases, patients must monitor these environmental conditions and make the necessary adjustments to ensure they receive an adequate oxygen supply. Existing cannulas used for oxygen delivery typically consist of a single oxygen tube extending from the oxygen concentrator, which then splits at a joint into two smaller tubes positioned along the sides of the patient's head, converging at a central portion designed to interface with the patient. To enhance comfort and mobility, the oxygen tubes are often made longer, allowing patients greater freedom of movement. However, longer tubing increases the likelihood of kinks forming, which can obstruct the oxygen flow. When a kink occurs at a distance from the patient, they may need to move to locate and resolve the issue. This movement may increase the patient's oxygen demand, requiring them to further adjust the oxygen valve to ensure an adequate supply.

The embodiments described herein relate to a cannula design which has an electrical cable integrally formed with an oxygen supply tube. In one aspect, the integrated electrical cable may reinforce and/or stiffen the oxygen supply tube mitigating kinks developing in the oxygen supply tube. The electrical cable may include a connector for providing a reliable wired electrical connection for transmitting power and data with a removable patient movement sensor.

Figure 2:
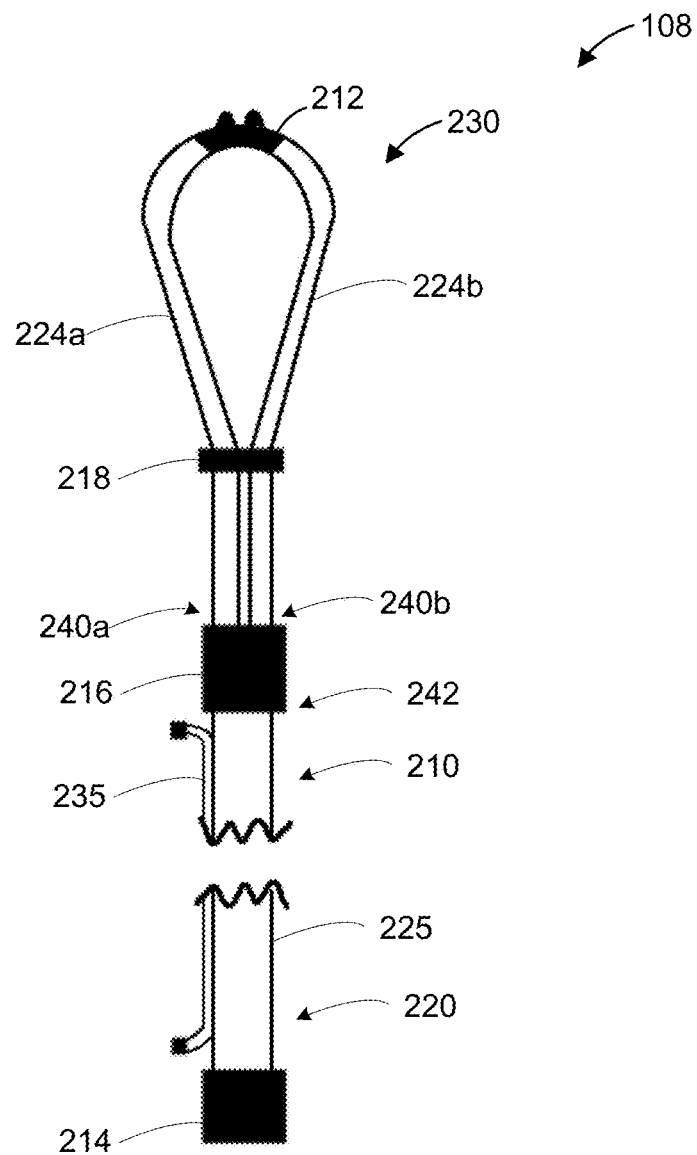
FIG. 2 is a schematic illustration of a nasal cannula of the oxygen supply system of FIG. 1.

Reference is made to FIG. 2, which illustrates a kink and tangle resistant smart-enabled nasal cannula 108 in accordance with an embodiment. Nasal cannula 108 delivers supplemental oxygen to a patient by directing a flow of oxygen from an oxygen concentrator to the patient. As shown, nasal cannula 108 may include a patient interface 230 and an oxygen supply tube 225. The oxygen supply tube 225 extends from an oxygen concentrator connection end 220 to a patient end 210, the patient end 210 being downstream of the oxygen concentrator connection end 220. The nasal cannula 108 may also include an oxygen supply connector 214, a split joint 216, and an electrical cable 235, among other components. The oxygen supply connector 214 may be located at the oxygen concentrator connection end 220 of the oxygen supply tube 225. The split joint 216 may be located at the patient end 210 of the oxygen supply tube 225. The split joint 216 may provide a physical connection of the patient interface 230 to the oxygen supply tube 225 and establish fluid communication between the patient interface 230 and the oxygen supply tube 225. The oxygen supply connector 214 may provide a physical connection of the oxygen supply tube 225 to an oxygen concentrator, such as oxygen concentrator 104 illustrated in FIG. 1, and establish fluid communication between the oxygen supply tube 225 and the oxygen concentrator 104.

The patient interface 230 can have any design suitable for providing oxygen to the patient and connecting to an oxygen supply tube 225. For example, patient interface 230 may include nasal prongs, a face mask connection, or a mouthpiece to deliver oxygen directly to the patient. Patient interface 230 may also include two patient interface oxygen supply tubes 224a, 224b. In the illustrated embodiment, the patient interface 230 includes nasal prongs 212. Nasal prongs 212 may be more advantageous for delivering oxygen to a patient because they are lightweight, less restrictive, and allow for greater patient mobility compared to a face mask or mouthpiece. Nasal prongs 212 may also enable patients to eat, drink, and speak freely without obstruction, making them ideal for long-term oxygen therapy. In some embodiments, patient interface may have one nasal prong. In other embodiments, the patient interface 230 may not have nasal prongs and instead may include a face mask or a mouthpiece.

Nasal prongs 212 may have any design suitable to deliver oxygen to a patient's nostrils. For example, nasal prongs 212 may be formed as soft, flexible, and ergonomically shaped to fit comfortably within the nasal passages of the patient allowing for prolonged use without causing significant discomfort. In other embodiments, the nasal prongs 212 may be rigid or more structured, which may provide increased durability and stability in certain applications.

Nasal prongs 212 may be made from any material suitable for effective oxygen delivery. For example, they may be constructed from medical-grade silicone, thermoplastic elastomers (TPE), or soft PVC, which provide flexibility, biocompatibility, and comfort for extended wear. These materials help to minimize skin irritation and pressure points while ensuring an effective seal. In other embodiments, the nasal prongs 212 may not be made from the previously mentioned materials but may be made from rigid plastics or other non-flexible materials, which may offer increased durability. The choice of material for nasal prongs 212 may depend on factors such as patient comfort, intended usage duration, and specific medical requirements.

In some embodiments, patient interface 230 may include a slide bolo 218 to help control the positioning and fit of the patient interface 230 around the patient's head or neck. The slide bolo 218 may be configured to slide along the patient interface oxygen supply tubes 224a, 224b allowing the patient to easily adjust the tightness of the interface to prevent slippage and enhance stability during use. In some embodiments, the slide bolo 218 may be made from medical-grade plastic, silicone, rubber, or other flexible and biocompatible materials, which provide durability, ease of adjustment, and comfort for extended wear. This may permit improved fit customization, reduced movement of the nasal prongs, and enhanced oxygen delivery consistency. In other embodiments, alternative adjustable securing mechanisms may be used, for example, clip fasteners, elastic retainers, hook-and-loop fasteners, or tension-adjusting buckles, which similarly allow the patient to modify the fit based on individual needs and preferences. In alternative embodiments, patient interface 230 has no slide bolo and no other securing mechanisms.

The split joint 216 of nasal cannula 108 can have any design suitable for connecting the patient interface 230 with the oxygen supply tube 225 and which allows for the bifurcation of the oxygen supply at the patient interface 230. Split joint 216 may have two split joint oxygen supply tube ends 240a, 240b and a split joint patient interface end 242 located upstream of the two split joint oxygen supply tube ends 240a, 240b. The two split joint oxygen supply tube ends 240a, 240b may be connected to the two patient interface oxygen supply tubes 224a, 224b. The split joint patient interface end 242 may be connected to the patient interface end 210 of the oxygen supply tube 225. For example, split joint 216 may be a Y-joint or a T-joint. In the illustrated embodiment, the split joint 216 is a Y-joint. A Y-joint may provide a smoother and more efficient oxygen flow distribution. The angled design of a Y-joint may allow oxygen to split more naturally, reducing turbulence and ensuring more even delivery to both nostrils.

The split joint 216 may be a discrete connector used to connect the patient interface 230 and the oxygen supply tube 225 or may be integrally formed with one or both of the patient interface 230 and the oxygen supply tube 225. In an alternative embodiment, patient interface 230 may have no split joint and only one patient interface supply tube.

Patient interface oxygen supply tubes 224a, 224b can have any design suitable for delivering oxygen from the oxygen supply tube 225 to the patient using nasal prongs 212. Each of the patient interface oxygen supply tube 224a, 224b have a central lumen extending longitudinally from the two split joint oxygen supply tube ends 240a, 240b to the nasal prongs 212 of the patient interface 230. The central lumens create an open internal channel for oxygen to flow. In some embodiments, the inner surface of the lumens may be treated or manufactured with a low-friction finish, which helps minimize airflow resistance, reduce drag, and ensure efficient and consistent oxygen transmission. The length of the patient interface oxygen supply tubes 224a, 224b may have any length suitable for delivering oxygen to the patient.

The patient interface oxygen supply tubes 224a, 224b may be made of any material suitable for efficient and safe oxygen delivery to the patient. For example, patient interface oxygen supply tubes 224a, 224b may be constructed from medical-grade silicone, thermoplastic elastomers (TPE), polyvinyl chloride (PVC), or other flexible, biocompatible materials. In some embodiments, the patient interface oxygen supply tubes 224a, 224b may be made specifically from silicone or TPE, which provide several advantages. For instance, silicone offers high flexibility and softness, reducing pressure points and discomfort for the patient, while also being resistant to temperature variations and chemically stable for long-term use. TPE, on the other hand, provides enhanced elasticity and durability, allowing the tubing to withstand repeated bending and stretching without compromising airflow. These materials also contribute to reducing the risk of tube occlusion and ensure a more consistent oxygen supply. In some embodiments, the patient interface oxygen supply tubes 224a, 224b may be made of the same material as the oxygen supply tube 225, in other embodiments the patient interface oxygen supply tubes 224a, 224b may be made from a different material from the oxygen supply tube 225.

The oxygen supply tube 225 can have any design suitable for delivering oxygen from an oxygen concentrator, such as oxygen concentrator 104 illustrated in FIG. 1, to the patient interface 230. As shown in FIG. 2, the oxygen supply tube 225 may include a patient end 210 and an oxygen concentrator connection end 220. The oxygen concentrator connection end 220 is designed to connect to an oxygen concentrator such as oxygen concentrator 104 in FIG. 1. The patient end 210 of the oxygen supply tube 225 may be designed to connect to a patient interface, in combination with a split joint 216, such as patient interface 230.

Figure 3A:
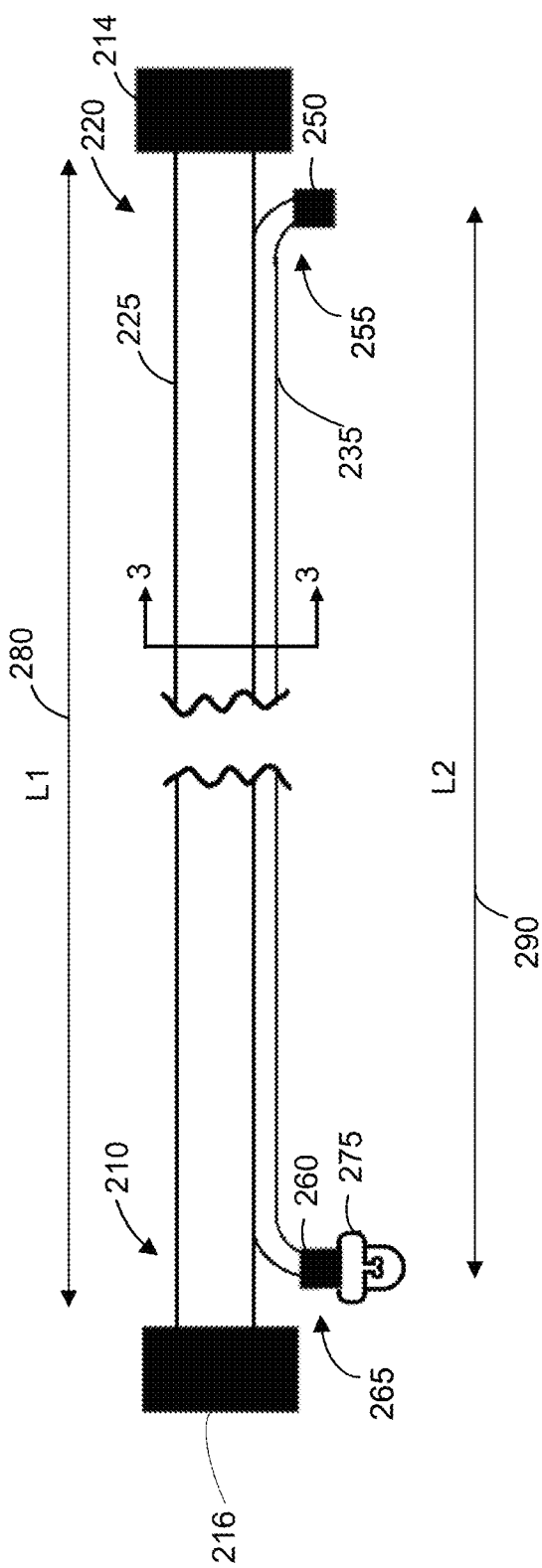
FIG. 3A is a schematic illustration of an example oxygen supply tube of the nasal cannula of FIG. 2.
Figure 4:
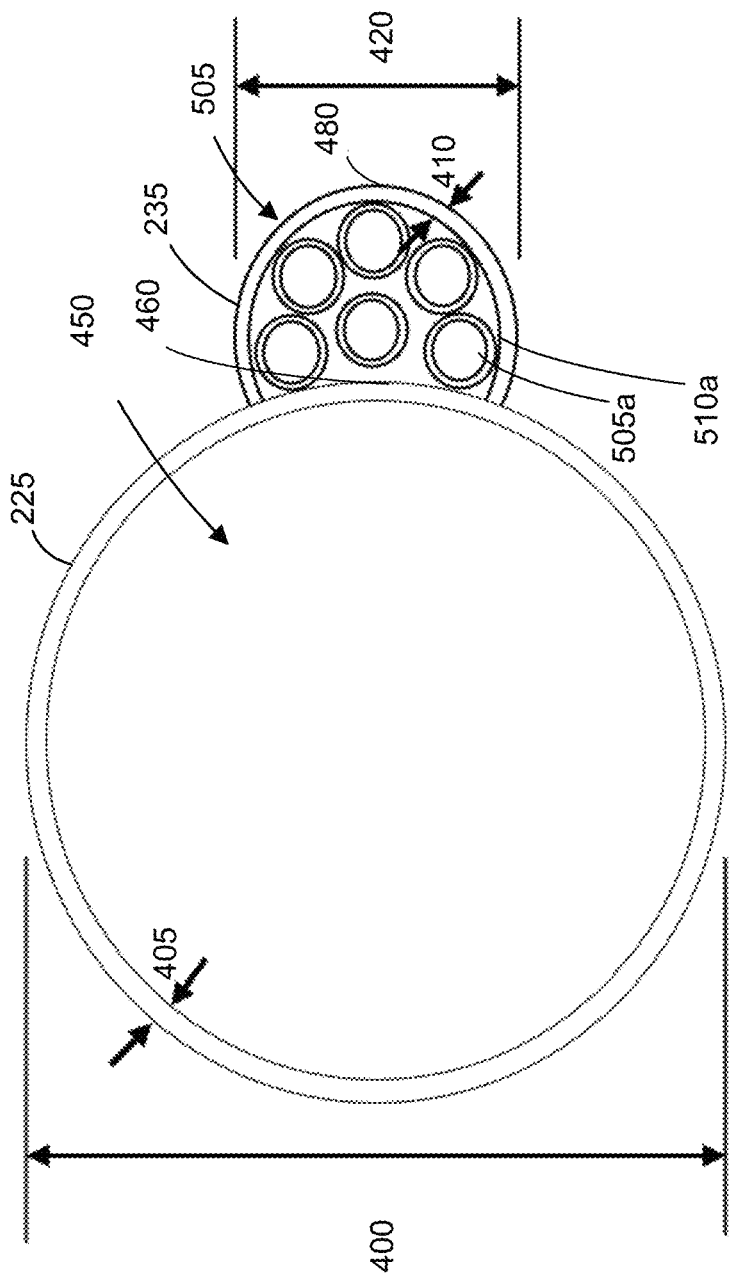
FIG. 4 is a cross-sectional view taken along line 3-3 in FIG. 3A.

FIG. 4 is a cross-sectional view of the oxygen supply tube 225 taken along line 3-3 in FIG. 3A. As shown, the oxygen supply tube 225 may have a substantially circular tube sidewall 460 with a single central lumen 450 designed to facilitate the flow of oxygen to the patient interface 230 to be delivered to the patient. The oxygen supply tube 225 may have an oxygen supply tube outer diameter 400, which defines the width of the oxygen supply tube 225. The oxygen supply tube 225 also includes an oxygen supply tube thickness 405. The outer diameter 400 may be optimized to balance oxygen flow rate and pressure, ensuring that sufficient oxygen is delivered to the patient even when the tubing is extended to its maximum length. The outer diameter 400 of the oxygen supply tube 225 may range from 4 mm to 20 mm depending on the material composition and desired oxygen flow rate.

The central lumen 450 extends longitudinally throughout the entire length of the oxygen supply tube 225 extending from the oxygen concentrator connection end 220 to the patient end 210, creating an open internal channel for oxygen to flow. In some embodiments, the inner surface of the lumen may be treated or manufactured with a low-friction finish, which helps minimize airflow resistance, reduce drag, and ensure efficient and consistent oxygen transmission. With reference to FIG. 3A, oxygen supply tube 225 may have an oxygen supply tube length 280. The oxygen supply tube length 280 can have any length suitable for delivering oxygen to the patient. For example, the oxygen supply tube 225 may be manufactured in a length within a range of 4 feet (1.2 meters) to 50 feet (15 meters) to maintain optimal oxygen flow and delivery efficiency.

The oxygen supply tube 225 may be made of any material suitable for efficient and safe oxygen delivery to the patient. For example, the oxygen supply tube 225 may be constructed from medical-grade silicone, thermoplastic elastomers (TPE), polyvinyl chloride (PVC), or other flexible, biocompatible materials. The material of the oxygen supply tube 225 may be selected based on factors such as flexibility, durability, resistance to kinking, and patient comfort. In some embodiments, the oxygen supply tube 225 may be made specifically from silicone or TPE, which provide several advantages. For instance, silicone offers high flexibility and softness, reducing pressure points and discomfort for the patient, while also being resistant to temperature variations and chemically stable for long-term use. TPE, on the other hand, provides enhanced elasticity and durability, allowing the tubing to withstand repeated bending and stretching without compromising airflow. These materials also contribute to reducing the risk of tube occlusion and ensuring a more consistent oxygen supply. In some embodiments, the oxygen supply tube 225 may be made of the same material as the patient interface oxygen supply tubes 224a, 224b of the patient interface 230, in other embodiments the oxygen supply tube 225 may be made from a different material from the patient interface oxygen supply tubes 224a, 224b of the patient interface 230.

The oxygen supply connector 214 can have any design suitable for connecting an oxygen supply tube 225 to an oxygen concentrator, such as oxygen concentrator 104 in FIG. 1. The oxygen supply connector 214 may be located at the oxygen concentrator connection end 220 of the oxygen supply tube 225. The oxygen supply connector 214 may be a discrete connector or integrally formed with the oxygen supply tube 225 at the oxygen concentrator connection end 220 of the oxygen supply tube 225. The oxygen supply connector 214 may be a standardized fitting, such as a barbed, threaded, or quick-connect type, ensuring compatibility with various types of oxygen concentrators. The oxygen supply connector 214 may be reinforced with strain relief features to prevent kinking or disconnection during use.

The oxygen supply connector 214 may be made of any material suitable for connecting the oxygen supply tube 225 to an oxygen concentrator. For example, the oxygen supply connector may be made from plastics, such as polycarbonate (PC), polyethylene (PE), polypropylene (PP), Acrylonitrile Butadiene Styrene (ABS), Polyvinyl Chloride (PVC). In some embodiments, the oxygen supply connector may be made from silicone or metal. In the illustrated embodiment the oxygen supply connector 214 is a discrete plastic connector. A discrete plastic connector provides additional advantages, such as being reusable with other oxygen supply tubes and being safe, affordable and easy to manufacture. In the preferred embodiment, the oxygen supply connector 214 is designed to connect to an oxygen concentrator, however in other embodiments, the oxygen supply connector 214 of the nasal cannula 108 may be connected to a compressed gas cylinder or an external wall supply, such as a hospital oxygen wall supply.

With continued reference to FIG. 3A, which illustrates the nasal cannula without the patient interface 230. The oxygen supply tube 225 may further include an electrical cable 235. The electrical cable 235 can have any design suitable to connect to a patient movement sensor and to an adaptive oxygen concentrator flow control system such as the oxygen concentrator flow control system 106 of FIG. 1.

Figure 5:
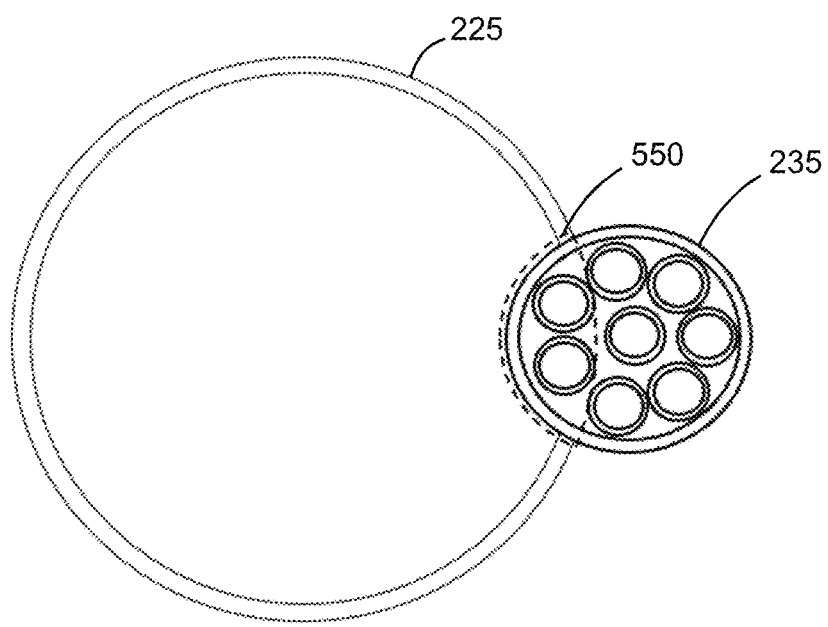
FIG. 5 is another example cross-sectional view taken along line 3-3 in FIG. 3A.

With reference to FIG. 4, which is a cross-sectional view of the oxygen supply tube 225 and the electrical cable 235 taken along line 3-3 in FIG. 3A, in the illustrated embodiment, the electrical cable 235 may have a substantially circular cable sidewall 480 and may be integrally formed or permanently connected with the oxygen supply tube sidewall 460. As illustrated in the embodiment, the electrical cable diameter 420 is less than the outer diameter 400 of the oxygen supply tube 225. The electrical cable 235 may have an electrical cable diameter 420 and an electrical cable casing thickness 410 as shown in FIG. 4. The oxygen supply tube 225 may be substantially circular and the electrical cable 235 may have the geometry of a truncated circle integrally formed with or permanently connected to the oxygen supply tube sidewall 460. In an alternative embodiment, as illustrated in FIG. 5, the oxygen supply tube 225 may have the geometry of a truncated circle, with the electrical cable 235 occupying the truncated portion 550 of the oxygen supply tube 225. For example, the truncated portion may represent up to 25% of the oxygen supply tube 225 (e.g. 1% to 25%), such as for example, 1% to 10%, or 1% to 5%. In alternative embodiments, the truncated portion may be greater than 25%, such as 25% to 50% of the oxygen supply tube.

The electrical cable diameter 420 of the electrical cable 235 may range from 3 mm to 12 mm depending on the number of conductors, their insulation composition and whether they are shielded. This may be advantageous to increase the structural integrity of the oxygen supply tube 225. The integrally formed or permanently connected electrical cable 235 of the oxygen supply tube 225 may provide reinforcement and stiffening to the oxygen supply tube 225 thereby mitigating kinks in the oxygen supply. As shown, electrical cable diameter 420 may be less than oxygen supply tube outer diameter 400. For example, electrical diameter 420 may be 5% to 50% of oxygen supply tube outer diameter 400 such as 10% to 40%. In alternative embodiments, the electrical cable diameter 420 may be greater than the outer diameter 400 of the oxygen supply tube 225.

Figure 3B:
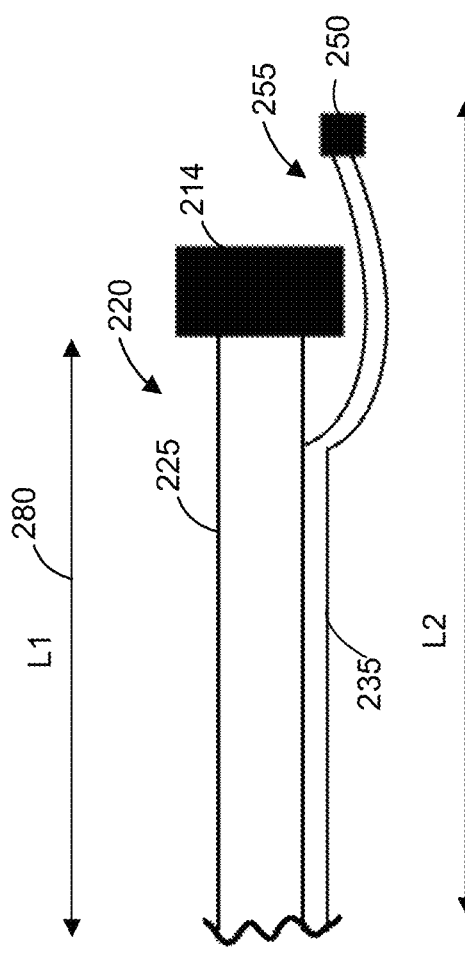
FIG. 3B is a schematic illustration of another example oxygen supply tube of the nasal cannula of FIG. 2.
Figure 3C:
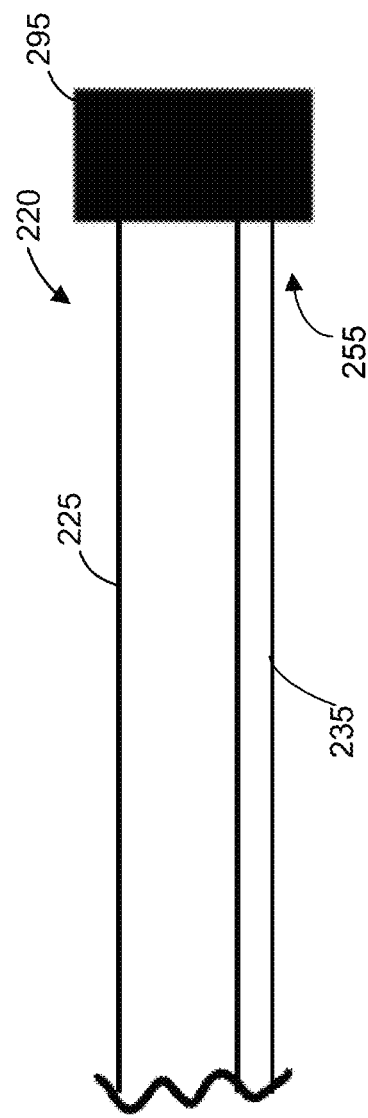
FIG. 3C is a schematic illustration of another example oxygen supply tube of the nasal cannula of FIG. 2.

The electrical cable 235 may have an electrical cable oxygen concentrator connection end 255 and a patient movement sensor connection end 265. The electrical cable oxygen concentrator connection end 255 of the electrical cable 235 may be proximate to the oxygen concentrator connection end 220 of the oxygen supply tube 225. The patient movement sensor connection end 265 of the electrical cable 235 may be proximate to the patient end 210 of the oxygen supply tube 225. The patient movement sensor connection end 265 of the electrical cable 235 may be connected to a patient movement sensor connector 260 that provides a removable connection to a patient movement sensor 275. The electrical cable oxygen concentrator connection end 255 of the electrical cable 235 may be connected to an oxygen concentrator flow control connector 250 that provides a connection to an oxygen concentrator flow control system, such as the oxygen concentrator flow control system 106 in FIG. 1. In the illustrated embodiment of FIG. 3A, the oxygen concentrator flow control connector 250 and the oxygen supply connector 214 are two different connectors. In an alternative embodiment, as illustrated in FIG. 3C, the electrical cable oxygen concentrator connection end 255 of the electrical cable 235 and the oxygen concentrator connection end 220 of the oxygen supply tube 225 may both terminate at the joint oxygen concentrator connector 295. The joint oxygen concentrator connector 295 may provide one connection point to the oxygen concentrator 104 and the oxygen concentrator flow control system 106. In the illustrated embodiment of FIG. 3A, an electrical cable length 290 is about the same length as an oxygen supply tube length 280. In alternative embodiments, as shown in FIG. 3B, the electrical cable length 290 may be longer than the oxygen supply tube length 280.

The electrical cable 235 may have a plurality of insulated conductors extending from the electrical cable oxygen concentrator connection end 255 of the electrical cable 235 to the patient movement sensor connection end 265 of the electrical cable. The plurality of insulated conductors may be contained within the electrical cable 235. With reference to FIG. 4, the illustrated embodiment shows the cross-section of electrical cable 235 with the cross-section of the plurality of insulated conductors 505. The illustrated embodiment shows six insulated conductors 505 housed within the electrical cable, however in alternative embodiments there may be more insulated conductors or there may be fewer insulated conductors within the electrical cable. In some examples, the electrical cable may have a minimum of three insulated conductors, each of the insulated conductors configured as one of a signal conductor, a power conductor, and a ground conductor. In some embodiments, the electrical cable may have multiple signal conductors, multiple power conductors, and/or multiple ground conductors. Each of the conductors may be insulated. For example, conductor 605a may be encased by insulation 510a. The insulation materials surrounding the conductors may include polyethylene (PE), polyvinyl chloride (PVC), fluoropolymers such as polytetrafluoroethylene (PTFE), or any other dielectric material. The insulation materials may be chosen to provide resistance to heat, moisture, and chemical exposure, ensuring durability and consistent performance in various environmental conditions. In some embodiments, the insulation 510a may be made of polyvinyl chloride (PVC) as it is affordable and flexible.

The conductors 505 can have any design suitable for transmitting data signals and power between the patient movement sensor and an oxygen concentrator flow control system, such as the oxygen concentrator flow control system 106 in FIG. 1. In certain embodiments, the conductors 505 may be arranged as single-ended wires, differential pairs, or twisted pairs to enhance performance and minimize interference. Differential pairs or twisted pair configurations may be particularly advantageous in reducing electromagnetic interference (EMI) and crosstalk, thereby improving signal integrity. The conductors may be formed from various conductive materials, including copper, aluminum, or copper-clad aluminum, selected based on electrical conductivity, weight considerations, and cost efficiency. In some embodiments, oxygen-free copper (OFC) or high-purity copper may be used to enhance conductivity and reduce signal loss, in the illustrated embodiment, lightweight aluminum conductors may be utilized to minimize overall cable weight.

The electrical cable 235 may be shielded or unshielded. In embodiments requiring enhanced EMI protection, the cable may include shielding such as a braided or foil shield composed of aluminum or copper, or a combination of both. A foil shield may provide superior high-frequency noise protection, whereas a braided shield may offer enhanced durability and flexibility. In unshielded embodiments, the design may rely on conductor configuration and insulation techniques to mitigate external noise. In the illustrated embodiment the electrical cable 235 is unshielded, however in other embodiments the cable may be shielded.

The patient movement sensor connector 260 can have any design suitable for connecting the electrical cable 235 to a patient movement sensor. The patient movement sensor connector 260 may be a discrete connector or may be integrally formed with the electrical cable 235 at the patient movement sensor connection end 265. The patient movement sensor connector 260 may be positioned proximate to the split joint 216. The patient movement sensor connector 260 may provide for the patient movement sensor to be removably connected to the electrical cable 235 at the patient movement sensor connection end 265. The ability to detach the patient movement sensor 275 from the electrical cable enables the patient movement sensor 275 to be connected to the patient movement sensor connector of a different electrical cable 235. Nasal cannula 108 is a consumable product that is periodically disposed of and replaced with another nasal cannula 108. The removable connection between the nasal cannula 108 and the patient movement sensor 275 allows for the patient movement sensor 275 to be detached from nasal cannula 108 before its disposal. The removed patient movement sensor 275 is then able to connect to a new nasal cannula 108. The ability to reuse the patient movement sensor 275 reduces the overall cost of the nasal cannula 108 as compared to a nasal cannula with a permanently connected patient movement sensor 275 that would be disposed with the nasal cannula 108.

The patient movement sensor connector 260 can have any design suitable for providing removable connectivity to patient movement sensor 275. For example, patient movement sensor connector 260 may be a snap-fit, threaded, or quick-release type connector. The patient movement sensor connector 260 may have electrical contacts for signal transmission and power delivery. The electrical contact may be gold-plated, silver-plated, nickel-plated, palladium-plated, tin-plated, rhodium-plated, or coated with a conductive polymer to enhance durability, prevent signal degradation, and provide resistance to corrosion and wear. In some embodiments, the patient movement sensor connector 260 may have a sensor connector housing constructed from high-strength plastic or metal to withstand repeated attachment cycles to the patient movement sensor 275.

The patient movement sensor 275 can have any design suitable for monitoring patient movement and for connecting to an electrical cable of an oxygen tube. The patient movement sensor 275 may be detachably reattached to the patient movement sensor connector 260 and may be located proximate to the split joint 216. When the nasal cannula 108 is in use with a patient, the split joint 216 will typically rest at or near the patient's chest. The patient movement sensor 275 being proximate to the split joint 216, and thereby the patient's chest while in use, is advantageous for monitoring the patient's movement. In some examples, patient movement sensor 275 may detect motion, orientation, and/or acceleration. For example, the patient movement sensor 275 may be a 6-axis accelerometer, integrating a three-axis accelerometer and a three-axis gyroscope. In other embodiments, the patient movement sensor 275 may be any other type of accelerometer, gyroscope, inertial measurement unit (IMU), magnetometer, optical motion sensor, or any combination thereof.

The oxygen concentrator flow control connector 250 can have any design suitable for connecting the electrical cable 235 to an adaptive oxygen concentrator flow control system such as the oxygen concentrator flow control system 106 of FIG. 1. The oxygen concentrator flow control connector 250 may be a discrete connector or may be integrally formed with the electrical cable 235 at the electrical cable oxygen concentrator connection end 255 of the electrical cable 235.

The oxygen concentrator flow control connector 250 may be a snap-fit, threaded, or quick-release type connector. The oxygen concentrator flow control connector 250 may have an electrical contact for signal transmission and power delivery. The electrical contact may be gold-plated, silver-plated, nickel-plated, palladium-plated, tin-plated, rhodium-plated, or coated with a conductive polymer to enhance durability, prevent signal degradation, and provide resistance to corrosion and wear. In some embodiments, the oxygen concentrator flow control connector 250 may have a connector housing constructed from high-strength plastic or metal to withstand repeated attachment cycles to the oxygen concentrator flow control system 106.

Figure 6:
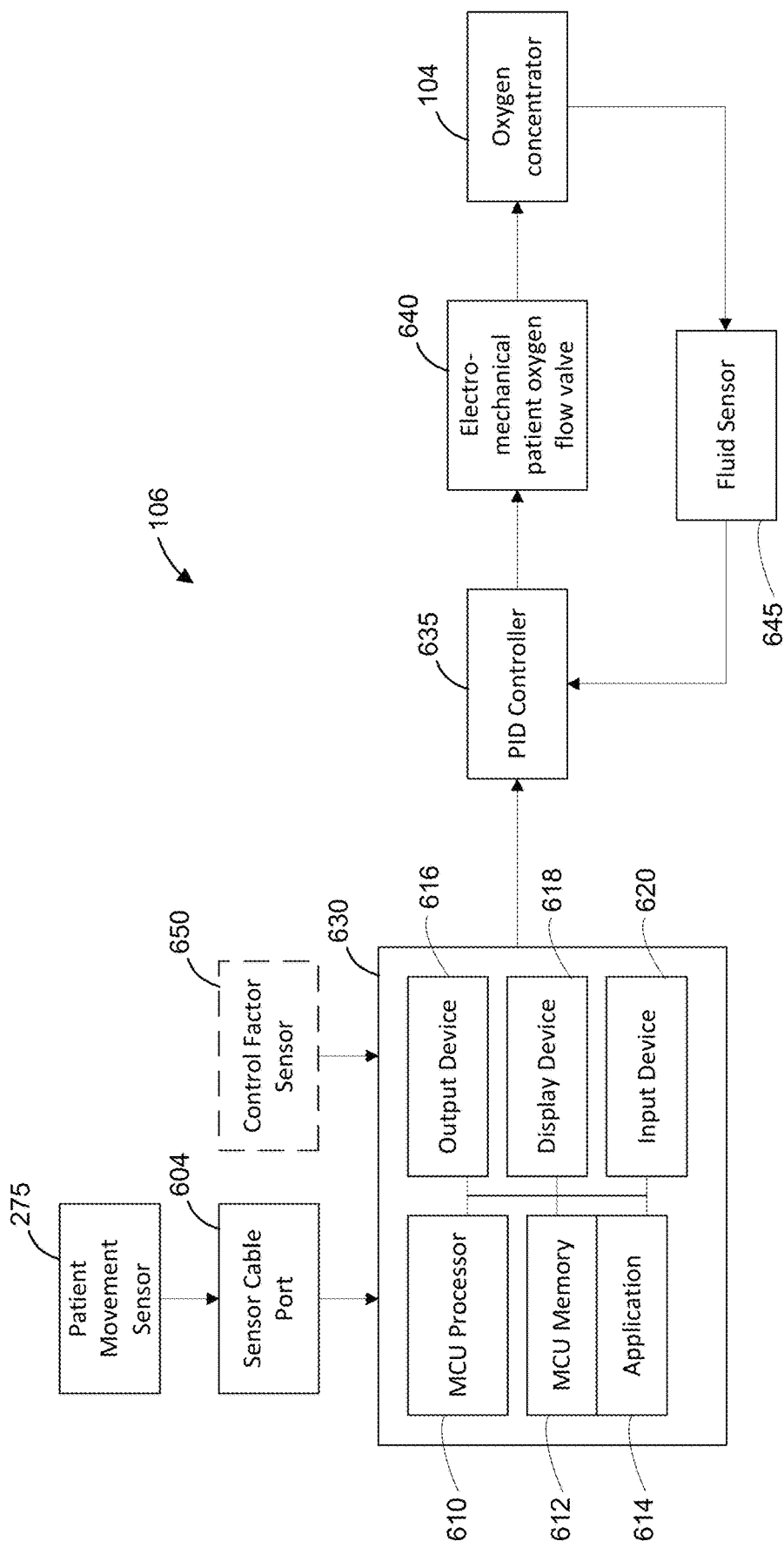
FIG. 6 is a schematic illustration of an oxygen concentrator flow control system of the patient oxygen supply system of FIG. 1.

The oxygen concentrator flow control system 106 of FIG. 1 can have any design suitable for adaptively controlling the flow of oxygen from an oxygen concentrator, such as oxygen concentrator 104 in FIG. 1, to a nasal cannula, such as nasal cannula 108. The oxygen concentrator flow control system 106, as shown in FIG. 6, may be communicatively coupled to an electro-mechanical patient oxygen flow valve 640 of the oxygen concentrator. The oxygen concentrator flow control system 106 may comprise a microcontroller unit 630, a proportional-integral-derivative (PID) controller 635, and an electromechanical patient oxygen flow valve 640. The PID controller 635 may be discrete hardware in communication with the microcontroller unit 630 or may be implemented as software on the microcontroller unit 630.

In the illustrated example of FIG. 6, the microcontroller unit 630 includes an MCU processor 610, an MCU memory 612, an application 614, an output device 616, a display device 618, and an input device 620. In some embodiments, microcontroller unit 630 includes multiple of any one or more of an MCU processor 610, an MCU memory 612, an application 614, an output device 616, a display device 618, and an input device 620. In some embodiments, microcontroller unit 630 does not include one or more of an application 614, an output device 616, a display device 618, and an input device 620.

MCU memory 612 may include random access memory (RAM) or similar types of memory. Also, in some embodiments, MCU memory 612 stores one or more applications 614 for execution by MCU processor 610. Applications 614 correspond with software modules including computer executable instructions to perform processing for the functions and methods described below. The MCU memory 612 may store a plurality of different PID configurations to be used by a PID controller, such as PID controller 635, and a plurality of patient oxygen mass flow rate setpoints.

Generally, MCU processor 610 can execute applications, computer readable instructions or programs. The applications, computer readable instructions or programs can be stored in MCU memory 612. When executed, the applications, computer readable instructions or programs can configure the MCU processor 610 (or multiple MCU processors 610, collectively) to perform the acts described herein.

Input device 620 can include any device for entering information into microcontroller unit 630. For example, input device 620 can be a sensor cable port, keyboard, keypad, cursor-control device, touchscreen, camera, or microphone. Input device 620 can also include input ports and wireless radios (e.g. Bluetooth®, or 802.11x) for making wired and wireless connections to external devices.

Display device 618 can include any type of device for presenting visual information. For example, display device 618 can be a computer monitor, a flat-screen display, a projector or a display panel.

Output device 616 can include any type of device for presenting a hard copy of information, such as a printer for example. Output device 206 can also include other types of output devices such as speakers, for example. In at least one embodiment, output device 616 includes one or more of output ports and wireless radios (e.g. Bluetooth®, or 802.11x) for making wired and wireless connections to external devices.

FIG. 6 illustrates one example hardware schematic of a microcontroller unit 630. In alternative embodiments, microcontroller unit 630 contains fewer, additional or different components. In addition, although aspects of an implementation of microcontroller unit 630 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

Figure 7:
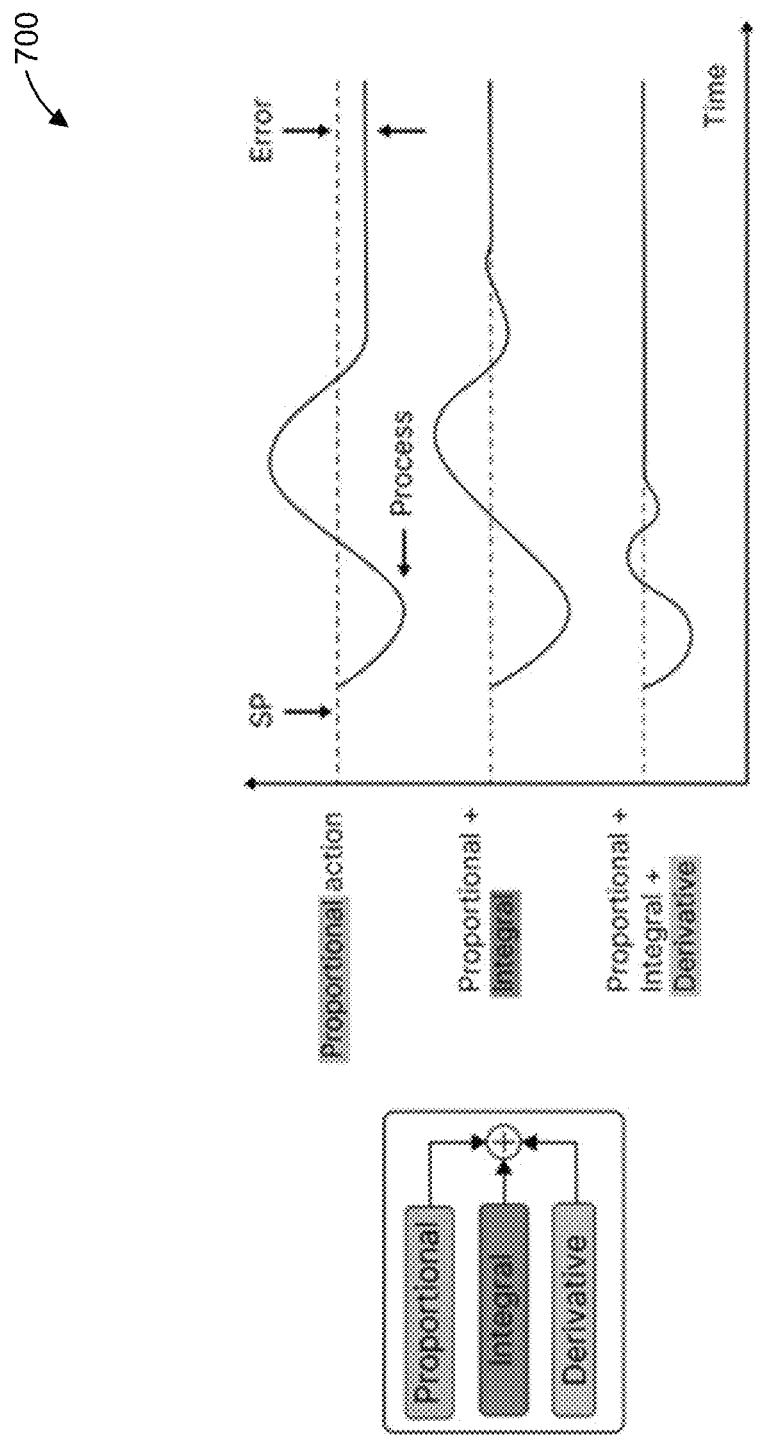
FIG. 7 is a diagram illustrating an example step response of a PID controller of the patient oxygen supply system of FIG. 1.

PID controller 635 is a feedback control system widely used to regulate processes by continuously adjusting an output to minimize the error between a desired setpoint and the actual process variable. FIG. 7 illustrates the step responses 700 of a PID controller, such as PID controller 635. In the described embodiment, the desired PID setpoints correspond to a plurality of patient oxygen mass flow rate setpoints. The PID controller operates through three main components: a proportional (P) gain constant, which reacts to the current error by applying an output change proportional to the difference between the desired setpoint and the actual value; the integral (I) gain constant, which accounts for past errors by summing them over time and adjusting the output to eliminate steady-state deviations; and the derivative (D) gain constant, which predicts future errors based on the rate of change and makes adjustments to prevent overshoot or instability. When properly tuned, a PID controller can quickly and efficiently bring a system to its desired state with minimal overshoot and steady-state error.

In use, the oxygen concentrator flow control system 106 automatically controls the flow of oxygen to the patient from the oxygen concentrator 104. MCU processor 610 can receive patient movement sensor signals from a remote patient movement sensor cable port, which may be connected to the patient movement sensor 275. As described, the patient movement sensor 275 may be a 6-axis motion sensor. A 6-axis motion sensor may measure movement and orientation in three-dimensional space using two types of sensors: a 3-axis accelerometer and a 3-axis gyroscope. Based in part on the patient movement sensor signals, the MCU processor 610 can determine a target patient oxygen mass flow rate setpoint from a plurality of patient oxygen mass flow rate setpoints stored in the MCU memory 612. The patient oxygen mass flow rate setpoints may include, for example, a low patient activity setpoint and a high patient activity setpoint, where the low patient activity setpoint is lower than the high patient activity setpoint. The low patient activity setpoint may correspond to activities such as resting, sitting, or sleeping, and the high patient activity setpoint may correspond to activities such as walking, exercising, or increase exertion by the patient. For example, the low patient activity setpoint may correspond to an oxygen flowrate of 1 liter or less of oxygen per minute and the high patient activity setpoint may correspond to an oxygen flowrate of 4 liters or more of oxygen per minute. As used herein and in the claims, reference to oxygen delivery in "liters per minute" means a mass flow rate equivalent to this many liters per minute at a fluid pressure of 1 atmosphere. If the patient movement sensor signals indicate a high patient activity, then MCU processor 610 may select a high patient activity setpoint. Conversely, if the patient movement sensor signals indicate a low patient activity, then the MCU processor 610 may select a low patient activity setpoint.

The MCU memory 612 of the microcontroller unit 630 may store the plurality of oxygen mass flow rate setpoints. In some embodiments, the MCU memory 612 may store additional patient oxygen mass flow rate setpoints. Additional patient oxygen mass flow rate setpoints may be entered into the microcontroller unit 630 using input device 620, such as a user interface. The MCU memory 612 may also store a plurality of different PID configurations, where at least two of the PID configurations are associated with a system control factor. The system control factor may include a patient activity level, battery charge level, ambient environmental condition, component wear sensitivity, and time of day. Each of the system control factors may include at least two mutually exclusive states including at least a first control factor state and a second control factor state. The at least two PID configurations include a first PID configuration corresponding to the first control factor state and a second PID configuration corresponding with the second control factor state.

The patient activity level system control factor can have a first control factor state and a second control factor state, each control factor state having a different PID configuration. The first control factor state may correspond to a high activity detection and a first PID configuration. The first PID configuration may include increasing the proportional gain constant allowing for faster responses to sudden increases in oxygen demand, such as during walking or exercising. The first PID configuration may also include reducing the derivative gain constant to prevent the system from being overly cautious and lag in response to rapid changes. For example, the first PID configuration may involve increasing the proportional gain constant to be between 0.6 to 0.9 and decreasing the derivative gain constant to be between 0.1 to 0.2. The second control factor state may correspond to a low activity detection and a second PID configuration. The second PID configuration may include decreasing the proportional gain constant, which may minimize unnecessary oxygen valve adjustments and maintain overall system stability. The second PID configuration may also include increasing the derivative gain constant to provide smoother operation and help prevent overshooting during steady, low-demand conditions. For example, the second PID configuration may involve decreasing the proportional gain constant to be between 0.2 to 0.4 and increasing the derivative gain constant to be between 0.2 to 0.5.

The battery charge level system control factor can have a first control factor state and a second control factor state, each control factor state having a different PID configuration. The first control factor state may correspond to a low battery level (e.g. below 50% charge or below 25% charge) and a first PID configuration. The first PID configuration may include increasing the integral gain constant to emphasize maintaining steady states with minimal corrections and reduce power use from frequent adjustments. The first PID configuration may also include decreasing the proportional gain constant to reduce the system's aggressiveness thereby conserving power. For example, the first PID configuration may involve increasing the integral gain constant to be between 0.08 to 0.15 and decreasing the proportional gain constant to be between 0.3 to 0.5. The second control factor state may correspond to a high battery level (e.g. greater than 50% charge, or greater than 75% charge) and a second PID configuration. The second PID configurations may include increasing the proportional gain constant to enable the system to respond more aggressively, leveraging available power for optimal performance. For example, the second PID configuration may involve increasing the proportional gain constant to be between 0.6 to 0.8 and decreasing the integral gain constant to be between 0.02 to 0.05.

The ambient environmental condition system control factor can have a first control factor state and a second control factor state, each control factor state having a different PID configuration. The first control factor state may correspond to a high altitude (e.g. at least 1,000 feet above sea level) and a first PID configuration. The first PID configuration may include increasing the proportional gain constant to compensate for reduced air density and oxygen availability, ensuring the system meets the oxygen demand effectively. The first PID configuration may also include increasing the integral gain constant slightly to account for slower dynamics while avoiding excessive overshoot, as lower pressure at high altitude can impact the system's stabilization time. For example, the first PID configuration may involve increasing the proportional gain constant to be between 1.5 and 2.5 and increasing the integral gain constant to be between 0.3 to 0.5. The second control factor state may correspond to a low altitude (e.g., less than 1,000 feet above sea level) and a second PID configuration. The second PID configuration may include decreasing the proportional gain constant to allow for better natural oxygen availability, since the air density is higher at low altitude, the system will not need to overcorrect as much. The second PID configuration may also include decreasing the integral gain constant since faster oxygen delivery at low altitudes means the system reaches equilibrium faster, requiring less integral correction. For example, the second PID configuration may involve decreasing the proportional gain constant to be between 0.8 to 1.2 and decreasing the integral gain to be between 0.1 to 0.3.

In another embodiment, the first control factor state of the ambient environmental condition system control factor may correspond to a high temperature (e.g. above 25° C., or moderate temperature 5° C. to 25° C.) and a first PID configuration. The first PID configuration may include reducing the proportional and integral gain factors to prevent the system from becoming overstressed as higher temperatures may increase compressor inefficiency and strain. The first PID configuration may also include increasing the derivative gain constant to prioritize stability and allow for smoother transitions in high temperatures. For example, the first PID configuration may involve reducing the proportional gain constant to be between 0.7 to 1.2, reducing the integral gain constant to be between 0.1 to 0.3, and increasing the derivative gain constant to be between 0.8 to 1.5. The second control factor state of the ambient environmental condition system control factor may correspond to a low temperature (e.g. below 5° C.) and a second PID configuration. The second PID configuration may include increasing the proportional gain constant to compensate for slow response due to denser air and compressor inefficiencies in cold environments. The second PID configuration may also include increasing the integral gain constant to help the system maintain oxygen stability, counteracting delayed performance at lower temperatures. For example, the second PID configuration may involve increasing the proportional gain constant to be between 1.2 to 1.8 and increasing the integral gain constant to be between 0.4 to 0.7.

The component wear sensitivity system control factor can have a first control factor state and a second control factor state, each control factor state having a different PID configuration. The first control factor state may correspond to compressor efficiency focus and a first PID configuration. The first PID configuration may include increasing the integral gain constant to compensate for reduced compressor efficiency by maintaining steady pressure levels over time, thereby preventing pressure fluctuations as the compressor wears down. The first PID configuration may also include adjusting the proportional gain constant to ensure the system can still respond effectively without overburdening the compressor. For example, the first PID configuration may involve increasing the integral constant to be between 0.5 to 1.2 and adjusting the proportional gain constant to be between 1.5 to 2.5. The second control factor state may correspond to valve response focus and a second PID configuration. The second PID configuration may include increasing the proportional gain constant to overcome increased resistance due to wear and decreasing the derivative gain constant to prevent oscillations that could exacerbate wear on the electromechanical patient oxygen flow valve. For example, the second PID configuration may involve increasing the proportional gain constant to be between 2 to 3.5 and decreasing the derivative gain constant to be between 0.05 to 0.3.

The time-of-day system control factor can have a first control factor state and a second control factor state, each control factor state having a different PID configuration. The first control factor may correspond to a nighttime (e.g., from sunset to sunrise) and a first PID configuration. The first PID configuration may include decreasing the proportional gain constant to ensure quieter operation by reducing rapid adjustments and decreasing the integral gain constant may prevent unwanted oscillations. The first PID configuration may also include increasing the derivative gain constant to prioritize stability by preventing overshooting or unnecessary corrections during restful periods for the patient. For example, the first PID configuration may involve decreasing the proportional gain constant to be between 0.2 to 0.4, decreasing the integral gain constant to be between 0.1 to 0.3, and increasing the derivative gain constant to be between 0.3 to 0.5. The second PID configuration may correspond to a daytime (e.g., from sunrise to sunset) and a second PID configuration. The second PID configuration may include balanced gain constants to support normal activity levels and dynamic response to daytime variations. For example, the second PID configuration may have a proportional gain constant between 0.4 to 0.6, an integral gain constant between 0.2 to 0.4 and a derivative gain constant between 0.1 and 0.3.

The MCU processor 610 may determine a current control factor state and identify a PID configuration that is associated with the current control factor state. For example, if the MCU processor 610 determines that the current control factor state is a low battery level, then the MCU processor 610 will select the first control factor state corresponding to a low battery level and the PID configuration associated with the low battery level. In some embodiments, the current control factor may be determined by a control factor sensor 650. The control factor sensor 650 can have any design suitable for determining the current control factor state associated with the various system control factors (e.g., patient activity level, battery charge level, ambient environmental condition, component wear sensitivity, and time of day). The control factor sensor 650 can include one or more of a temperature sensor, altitude sensor, GPS, pressure sensor, flow sensor, power meter, accelerometer, position sensor, and a clock. Alternatively, the current control factor state may be received by the MCU processor 610 via input device 620 (e.g., entering current elevation, location, or receiving information via internet). For example, the patient or a clinician may enter the current elevation or temperature using a user interface associated with the microcontroller unit. The current control factor may also be determined by the MCU processor 610 (e.g., the time of day). In other embodiments, the microcontroller 630 may include a cellular module. The cellular module may be used to receive information related to a current control factor state (e.g., temperature, altitude, time of day, patient activity level) or the cellular module may be used to transmit information related to the oxygen concentrator flow control system to a remote device.

The PID controller 635 may receive the determined target patient oxygen mass flow rate and the selected PID configuration from the microcontroller unit 630. A fluid sensor 645 may continuously monitors the oxygen pressure within the oxygen concentrator 104, ensuring real-time assessment. Fluid sensor 645 transmits a patient oxygen flow measurement from the oxygen concentrator 104 to the PID controller 635. The patient oxygen flow measurement may be based on pressure, mass flow, or volumetric flow, depending on the specific monitoring requirements and system configuration. Fluid sensor 645 may be any sensor suitable for measuring properties of the patient oxygen flow from which a relative oxygen mass flow rate can be assessed or inferred. For example, the fluid sensor 645 may be one or more of a pressure sensor, volumetric flow sensor, mass sensor, temperature sensor, density sensor, ultrasonic flow sensor. The fluid sensor 645 may be an analog or digital sensor, or a more complex sensing device incorporating multiple detection mechanisms to enhance accuracy and responsiveness.

Based on the target patient oxygen mass flow rate and selected PID configuration, as determined by the MCU processor 610, and the patient oxygen flow measurement, as determined by the fluid sensor 645, the PID controller 635 may determine a patient oxygen flow valve control signal. The PID controller 635 may transmit the determined patient oxygen flow valve control signal to the electromechanical patient oxygen flow valve 640. The electromechanical patient oxygen flow valve 640 may receive the patient oxygen flow valve control signal and adjust its position accordingly to regulate the oxygen flow rate delivered to the patient. The oxygen flow valve control signal may direct the electromechanical patient oxygen flow valve 640 to open or close incrementally, allowing for fine-tuned adjustments to the oxygen flow. Alternatively, the patient oxygen flow valve control signal may specify a target position, prompting the electromechanical patient oxygen flow valve 640 to move to a precise setting to achieve the desired oxygen flowrate.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1. A kink and tangle resistant smart-enabled nasal cannula comprising:
- an oxygen supply tube having a substantially circular supply tube sidewall, a supply tube outer diameter, an oxygen concentrator connection end and a patient end downstream of the oxygen concentrator connection end;
- an electrical cable having a substantially circular cable sidewall integrally formed with the supply tube sidewall, an electrical cable diameter less than the supply tube outer diameter, an electrical cable oxygen concentrator connection end proximate the oxygen concentrator connection end of the oxygen supply tube, a patient movement sensor connection end proximate the patient end of the oxygen supply tube, and a plurality of insulated conductors extending from the electrical cable oxygen concentrator connection end to the patient movement sensor connection end;
- a patient movement sensor connector connected to the electrical cable at the patient movement sensor connection end;
- a split joint having a split joint patient interface end upstream of two split joint oxygen supply tube ends, the patient end of the oxygen supply tube connected to the split joint patient interface end; and
- a patient interface connected to the split joint patient interface end, the patient interface having at least one nasal prong.

Item 2. The nasal cannula of any other item, wherein the oxygen supply tube outer diameter is between 4 mm and 20 mm.

Item 3. The nasal cannula of any other item, wherein the electrical cable diameter is between 3 mm and 12 mm.

Item 4. The nasal cannula of any other item, further comprising a patient movement sensor connected to the patient movement sensor connector.

Item 5. The nasal cannula of any other item, wherein the patient movement sensor comprises one or more of: an accelerometer, a gyroscope, an inertial measurement unit (IMU), a magnetometer, and an optical motion sensor.

Item 6. The nasal cannula of any other item, wherein the patient interface further comprises a slide bolo.

Item 7. The nasal cannula of any other item, wherein the plurality of insulated conductors comprises:
- at least one power conductor;
- at least one signal conductor; and
- at least one ground conductor.

Item 8. The nasal cannula of any other item, wherein each of the insulated conductors of the plurality of insulated conductors are shielded.

Item 9. The nasal cannula of any other item, further comprising an oxygen supply connector connected to the oxygen concentrator connection end of the oxygen supply tube.

Item 10. The nasal cannula of any other item, wherein the electrical cable has an electrical cable length, and the oxygen supply tube has an oxygen supply tube length, wherein the electrical cable length is less than the oxygen supply tube length.

Item 11. The nasal cannula of any other item, wherein the electrical cable has an electrical cable length, and the oxygen supply tube has an oxygen supply tube length, wherein the electrical cable length is greater than the oxygen supply tube length.

Item 12. The nasal cannula of any other item, wherein the electrical cable further comprises an oxygen concentrator flow control connector at the electrical cable oxygen concentrator connection end.

Item 13. A patient oxygen supply system comprising:
- a patient oxygen concentrator having an adaptive oxygen concentrator flow control system, and
- the nasal cannula of any other item, wherein the oxygen concentrator flow control connector is connected to the adaptive oxygen concentrator flow control system.

Item 14. A patient oxygen concentrator comprising:
- an electro-mechanical patient oxygen flow valve;
- an adaptive oxygen concentrator flow control system communicatively coupled to the electro-mechanical patient oxygen flow valve, the adaptive oxygen concentrator flow control system comprising:
  - a microcontroller unit (MCU), the MCU comprising one or more MCU processors and an MCU memory, the one or more MCU processors configured to collectively:
    - store, in the MCU memory, a plurality of patient oxygen mass flow rate setpoints, the plurality of patient oxygen mass flow rate setpoints including at least a low patient activity setpoint that is lower than a high patient activity setpoint,
    - store, in the MCU memory, a plurality of different PID configurations, at least two of the PID configurations being associated with a system control factor, wherein the system control factor is at least one of patient activity level, battery charge level, ambient environmental condition, component wear sensitivity, and time of day, the system control factor having at least two mutually exclusive states including at least a first control factor state and a second control factor state, the at least two PID configurations including a first PID configuration corresponding to the first control factor state and a second PID configuration corresponding with the second control factor state, receive patient movement sensor signals from at least one remote patient movement sensor cable port, determine a target patient oxygen mass flow rate setpoint from among the plurality of patient oxygen mass flow rate setpoints based at least in part on the patient movement sensor signals, determine a current control factor state from among the at least two control factor states of the system control factor, and identify a selected PID configuration which is the PID configuration associated with the current control factor state;

a PID controller configured to:
receive a patient oxygen flow measurement;
determine a patient oxygen flow valve control signal based on the target patient oxygen mass flow rate, the patient oxygen flow measurement, and the selected PID configuration; and
transmit the patient oxygen flow valve control signal to the electro-mechanical patient oxygen flow valve.

Item 15. The oxygen concentrator of any other item, wherein the PID controller is implemented as software within the MCU.

Item 16. The oxygen concentrator of any other item, wherein the one or more MCU processors are further configured to collectively:
receive, from a user interface, additional patient oxygen mass flow rate setpoints; and
store, in the MCU memory, the additional patient oxygen mass flow rate setpoints.

Item 17. The oxygen concentrator of any other item, wherein the patient oxygen flow measurement is at least one of: an oxygen pressure, an oxygen mass flow rate, and an oxygen volumetric flow rate.

Item 18. The oxygen concentrator of any other item, wherein each of the at least two PID configurations includes at least one of: a proportional gain constant, an integral gain constant, and a derivative gain constant.

Item 19. The oxygen concentrator of any other item, wherein
the system control factor is patient activity level,
the first control factor state is high patient activity level,
the second control factor state is low patient activity level,
the first PID configuration comprises:
a proportional gain constant of 0.6 to 0.9, and
a derivative gain constant of 0.1 to 0.2, and
the second PID configuration comprises:
a proportional gain constant of 0.2 to 0.4, and
a derivative gain constant of 0.2 to 0.5.

Item 20. The oxygen concentrator of any other item, wherein when the patient movement sensor signals indicate high patient activity, the one or more MCU processors are configured to collectively determine the target patient oxygen mass flow rate setpoint to be the high patient activity setpoint, and to determine the current control factor state to be the first control factor state.

Item 21. The oxygen concentrator of any other item, wherein when the patient movement sensor signals indicate low patient activity, the one or more MCU processors are configured to collectively determine the target patient oxygen mass flow rate setpoint to be the low patient activity setpoint, and to determine the current control factor state to be the second control factor state.

Item 22. The oxygen concentrator of any other item, wherein
the system control factor is battery charge level,
the first control factor state is low battery level,
the second control factor state is full battery level,
the first PID configuration comprises:
a. a proportional gain constant of 0.08 to 0.15 and
b. an integral gain constant of 0.3 to 0.5, and
the second PID configuration comprises:
c. a proportional gain constant of 0.6 to 0.8, and
d. an integral gain constant of 0.02 to 0.05.

Item 23. The oxygen concentrator of any other item, wherein
the system control factor is ambient environmental condition,
the first control factor state is high altitude,
the second control factor state is low altitude,
the first PID configuration comprises:
a. a proportional gain constant of 1.5 to 2.5, and
b. an integral gain constant of 0.3 to 0.5, and
the second PID configuration comprises:
c. a proportional gain constant of 0.8 to 1.2, and
d. an integral gain constant of 0.1 to 0.3.

Item 24. The oxygen concentrator of any other item, wherein
the system control factor is ambient environmental condition,
the first control factor state is high temperature,
the second control factor state is low temperature,
the first PID configuration comprises:
a. a proportional gain constant of 0.7 to 1.2, and
b. an integral gain constant of 0.1 to 0.3, and
the second PID configuration comprises:
c. a proportional gain constant of 1.2 to 1.8, and
d. an integral gain constant of 0.4 to 0.7.

Item 25. The oxygen concentrator of any other item, wherein
the system control factor is component wear sensitivity,
the first control factor state is compressor efficiency,
the second control factor state is valve response,
the first PID configuration comprises:
a. a proportional gain constant of 1.5 to 2.5, and
b. an integral gain constant of 0.5 to 1.2, and
the second PID configuration comprises:
c. a proportional gain constant of 2 to 3.5, and
d. a derivative gain constant of 0.05 to 0.3.

Item 26. The oxygen concentrator of any other item, wherein
the system control factor is time of day,
the first control factor state is nighttime operation,
the second control factor state is daytime operation,
the first PID configuration comprises:
a. a proportional gain constant of 0.2 to 0.4, and
b. an integral gain constant of 0.1 to 0.3, and c. a derivative gain constant of 0.3 to 0.5, and
the second PID configuration comprises:
  d. a proportional gain constant of 0.4 to 0.6, and
  e. an integral gain constant of 0.2 to 0.4, and
  f. a derivative gain constant of 0.1 to 0.3.

The invention claimed is:

1. A patient oxygen concentrator comprising:
an electro-mechanical patient oxygen flow valve;
an adaptive oxygen concentrator flow control system communicatively coupled to the electro-mechanical patient oxygen flow valve, the adaptive oxygen concentrator flow control system comprising:
  a microcontroller unit (MCU), the MCU comprising one or more MCU processors and an MCU memory, the one or more MCU processors configured to collectively:
    store, in the MCU memory, a plurality of patient oxygen mass flow rate setpoints, the plurality of patient oxygen mass flow rate setpoints including at least a low patient activity setpoint that is lower than a high patient activity setpoint,
    store, in the MCU memory, a plurality of different PID configurations,
      at least two of the PID configurations being associated with a system control factor, wherein the system control factor is at least one of patient activity level, battery charge level, ambient environmental condition, component wear sensitivity, and time of day,
      the system control factor having at least two mutually exclusive states including at least a first control factor state and a second control factor state,
      the at least two PID configurations including a first PID configuration corresponding to the first control factor state and a second PID configuration corresponding with the second control factor state,
    receive patient movement sensor signals from at least one remote patient movement sensor cable port,
    determine a target patient oxygen mass flow rate setpoint from among the plurality of patient oxygen mass flow rate setpoints based at least in part on the patient movement sensor signals,
    determine a current control factor state from among the at least two control factor states of the system control factor, and identify a selected PID configuration which is the PID configuration associated with the current control factor state;
  a PID controller configured to:
    receive a patient oxygen flow measurement;
    determine a patient oxygen flow valve control signal based on the target patient oxygen mass flow rate, the patient oxygen flow measurement, and the selected PID configuration; and
    transmit the patient oxygen flow valve control signal to the electro-mechanical patient oxygen flow valve.

2. The oxygen concentrator of claim 1, wherein the PID controller is implemented as software within the MCU.

3. The oxygen concentrator of claim 1, wherein the one or more MCU processors are further configured to collectively:
receive, from a user interface, additional patient oxygen mass flow rate setpoints; and
store, in the MCU memory, the additional patient oxygen mass flow rate setpoints.

4. The oxygen concentrator of claim 1, wherein the patient oxygen flow measurement is at least one of: an oxygen pressure, an oxygen mass flow rate, and an oxygen volumetric flow rate.

5. The oxygen concentrator of claim 1, wherein each of the at least two PID configurations includes at least one of: a proportional gain constant, an integral gain constant, and a derivative gain constant.

6. The oxygen concentrator of claim 5, wherein
the system control factor is patient activity level,
the first control factor state is high patient activity level,
the second control factor state is low patient activity level,
the first PID configuration comprises:
  a proportional gain constant of 0.6 to 0.9, and
  a derivative gain constant of 0.1 to 0.2, and
the second PID configuration comprises:
  a proportional gain constant of 0.2 to 0.4, and
  a derivative gain constant of 0.2 to 0.5.

7. The oxygen concentrator of claim 6, wherein when the patient movement sensor signals indicate high patient activity, the one or more MCU processors are configured to collectively determine the target patient oxygen mass flow rate setpoint to be the high patient activity setpoint, and to determine the current control factor state to be the first control factor state.

8. The oxygen concentrator of claim 6, wherein when the patient movement sensor signals indicate low patient activity, the one or more MCU processors are configured to collectively determine the target patient oxygen mass flow rate setpoint to be the low patient activity setpoint, and to determine the current control factor state to be the second control factor state.

9. The oxygen concentrator of claim 5, wherein
the system control factor is battery charge level,
the first control factor state is low battery level,
the second control factor state is full battery level,
the first PID configuration comprises:
  a. a proportional gain constant of 0.08 to 0.15 and
  b. an integral gain constant of 0.3 to 0.5, and
the second PID configuration comprises:
  c. a proportional gain constant of 0.6 to 0.8, and
  d. an integral gain constant of 0.02 to 0.05.

10. The oxygen concentrator of claim 5, wherein
the system control factor is ambient environmental condition,
the first control factor state is high altitude,
the second control factor state is low altitude,
the first PID configuration comprises:
  a. a proportional gain constant of 1.5 to 2.5, and
  b. an integral gain constant of 0.3 to 0.5, and
the second PID configuration comprises:
  c. a proportional gain constant of 0.8 to 1.2, and
  an integral gain constant of 0.1 to 0.3.

11. The oxygen concentrator of claim 5, wherein
the system control factor is ambient environmental condition,
the first control factor state is high temperature,
the second control factor state is low temperature,
the first PID configuration comprises:
  a. a proportional gain constant of 0.7 to 1.2, and
  b. an integral gain constant of 0.1 to 0.3, and
the second PID configuration comprises:
  c. a proportional gain constant of 1.2 to 1.8, and
  an integral gain constant of 0.4 to 0.7.

12. The oxygen concentrator of claim 5, wherein
the system control factor is component wear sensitivity,
the first control factor state is compressor efficiency, the second control factor state is valve response,
the first PID configuration comprises:
   a. a proportional gain constant of 1.5 to 2.5, and
   b. an integral gain constant of 0.5 to 1.2, and
the second PID configuration comprises:
   c. a proportional gain constant of 2 to 3.5, and
   d. a derivative gain constant of 0.05 to 0.3.

13. The oxygen concentrator of claim 5, wherein
the system control factor is time of day,
the first control factor state is nighttime operation,
the second control factor state is daytime operation,
the first PID configuration comprises:
   a. a proportional gain constant of 0.2 to 0.4, and
   b. an integral gain constant of 0.1 to 0.3, and
   c. a derivative gain constant of 0.3 to 0.5, and
the second PID configuration comprises:
   d. a proportional gain constant of 0.4 to 0.6, and
   e. an integral gain constant of 0.2 to 0.4, and
   f. a derivative gain constant of 0.1 to 0.3.

\* \* \* \* \*